March 27, 1956  E. J. BARNETT  2,739,741
MEASURING AND DISPENSING DEVICE
Filed March 2, 1953
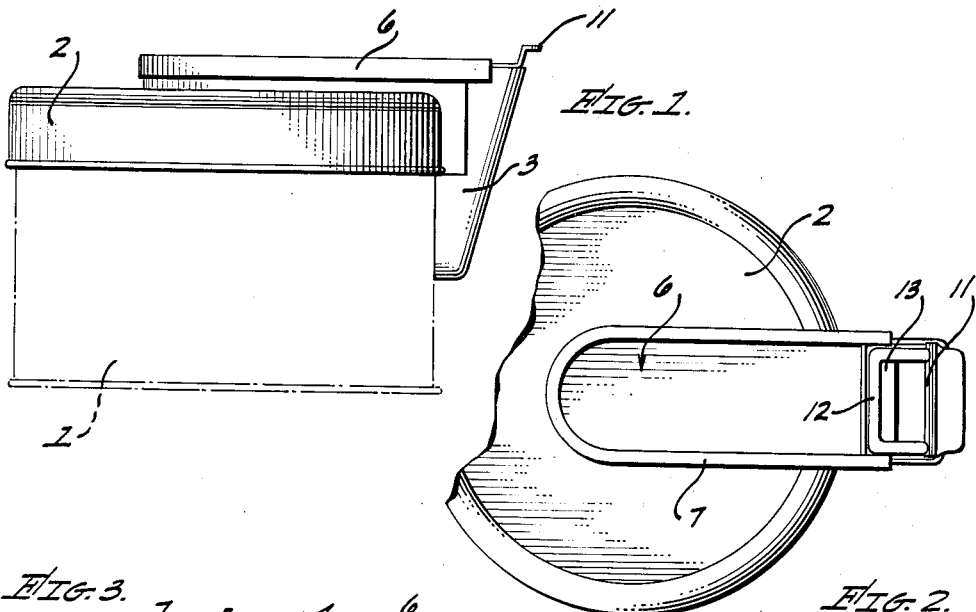
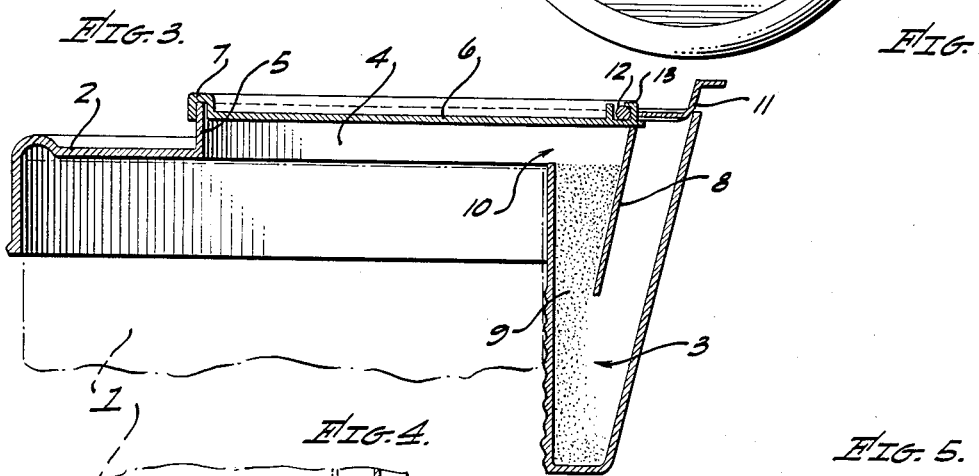
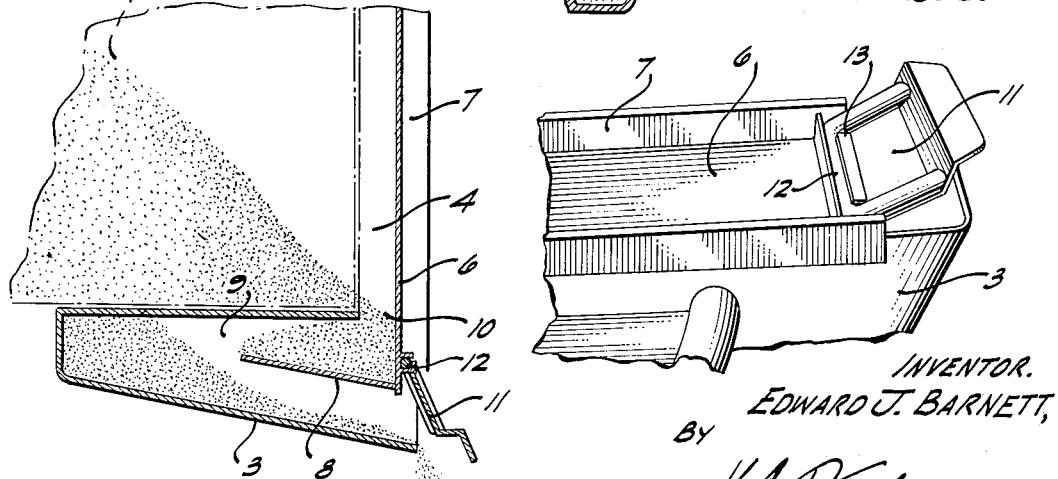
INVENTOR.
EDWARD J. BARNETT,
BY
ATTORNEY.

2,739,741
MEASURING AND DISPENSING DEVICE

Edward Joseph Barnett, South Gate, Calif.

Application March 2, 1953, Serial No. 339,670

3 Claims. (Cl. 222—455)

This invention relates to a measuring and dispensing device whereby granular material, such as ground coffee, can be dispensed from a can which contains this granular substance.

An object of my invention is to provide a measuring and dispensing device which includes a cover or cap for the can containing the granular substance, such as coffee, and this cover or cap is provided with a dispensing receptacle which receives a measured quantity of coffee, or the like, from the can and in turn dispenses the measured quantity of coffee each time that the can is tilted.

Another object of my invention is to provide a novel measuring and dispensing device in which the cover portion of the device includes an integrally formed spout, the spout being so constructed and arranged that it will receive a measured quantity of coffee, or the like, each time that the can is tilted, and will simultaneously collect a quantity of coffee which drops into the bottom of the spout when the can is returned to an upright position.

A feature of my invention resides in a novel measuring and dispensing device which can be formed of a flexible type of plastic and with a removable plate on the top, which gives access to the top of the spout for the purpose of cleaning or necessary repairs.

Other objects, advantages and features of invention may appear from the accompanying drawing, the subjoined detailed description and the appended claims.

In the drawing:

Figure 1 is a side elevation of my measuring and dispensing device as mounted on a can.

Figure 2 is a fragmentary top plan view of the same.

Figure 3 is a transverse sectional view of my measuring and dispensing device.

Figure 4 is a fragmentary transverse sectional view showing the position of the parts when the can is tilted.

Figure 5 is a fragmentary perspective view of the upper part of the spout of the dispensing device.

Referring more particularly to the drawing, the numeral 1 indicates a can which contains a granular substance, such as ground coffee. The top of the metal can 1 is removed in the usual manner. My measuring and dispensing device includes a cover or lid 2 which fits closely on the top of the can 1 and is preferably formed of a flexible type of plastic so that it will closely grip the upper part of the can. A spout 3 is integrally formed with the cover 2 and this spout 3 is positioned on the outside of the can 1 and projects downwardly below the lower edge of the cover 2, substantially as shown. An opening 4 is formed in the top of the cover or lid 2 and this opening is surrounded by an upwardly projecting wall 5, this wall being substantially U-shaped. A cover 6 closes the opening 4 and the cover is provided with a channel 7 around the edges thereof which fits on the wall 5, thus closing the opening 4. The cover 6 can be removed, if necessary, for purposes of cleaning the spout 3, or otherwise cleaning or repairing the device.

A tongue 8 projects downwardly from the bottom of the cover 6 and this tongue extends into the spout 3 and the lower edge of the tongue is spaced from the back wall of the spout 3 to form an opening 9. This opening permits the coffee to drop into the bottom of the spout 3 to leave a charge of coffee in the bottom of the spout whenever the can 1 is in an upright position. When the can is tilted, as shown in Figure 4, the coffee in the bottom of the spout 3 will pour out through the top of the spout, and simultaneously a charge of coffee will pour through the opening 10 and will deposit on the inner surface of the tongue 8. The tongue 8 is of sufficient width and tightly engages the side walls of the spout 3, thus it acts like a spoon to hold a quantity of coffee on the inner surface thereof until the can 1 is placed in an upright position, whereupon the coffee deposited on the tongue 8 will drop into the bottom of the spout 3 through the opening 9.

A cap 11 is hingedly attached to the front edge of the cover 6 and when pressed downwardly closes the top of the spout 3 to prevent coffee, or other granular material, from accidently spilling out of the spout. The cap 11 is formed with a hinge pin 12, the pin fitting behind an upwardly extending finger 13 which projects from the front edge of the cover 6. A hinge is thus formed for the cap 11 and, since the measuring and dispensing device is preferably formed of a flexible plastic, the parts 12 and 13 can be pressed together and there is enough spring to permit them to fit properly.

Having described my invention, I claim:

1. A measuring and dispensing device, comprising a container, a lid portion adapted to closely fit the top of the container, a spout integrally formed with the lid, extending vertically therefrom and positioned on the outside of the container, said lid having an opening therein extending into the spout adjacent the top of the spout, a vertical wall surrounding said opening, a cover, said cover having a groove therein to receive the wall, a tongue depending from the cover and projecting into the spout, the lower end of the tongue being spaced from the rear wall of the spout to form an opening.

2. A measuring and dispensing device, comprising a container, a lid portion adapted to closely fit the top of the container, a spout integrally formed with the lid, extending vertically therefrom and positioned on the outside of the container, said lid having an opening therein extending into the spout adjacent the top of the spout, a vertical wall surrounding said opening, a cover, said cover having a groove therein to receive the wall, a tongue depending from the cover and projecting into the spout, the lower end of the tongue being spaced from the rear wall of the spout to form an opening, and a cap, and means hingedly attaching the cap to the cover to close the top of the spout.

3. A measuring and dispensing device, comprising a container, a lid portion adapted to closely fit the top of the container, a spout integrally formed with the lid, extending vertically therefrom and positioned on the outside of the container, said lid having an opening therein extending into the spout adjacent the top of the spout, a vertical wall partly surrounding said opening, a cover, said cover having a groove therein to receive the wall, a tongue depending from the cover and projecting into the spout, said tongue being positioned opposite said opening in the lid, and the tongue closely fitting the side walls of the spout, the lower end of the tongue being spaced from the rear wall of the spout to form an opening.

References Cited in the file of this patent

UNITED STATES PATENTS

| 1,328,184 | Moore | Jan. 13, 1920 |
| 2,243,452 | Bickel et al. | May 27, 1941 |